United States Patent [19]

Sepahpur

[11] Patent Number: 4,567,877
[45] Date of Patent: Feb. 4, 1986

[54] HEAT STORAGE FOOD CONTAINER

[76] Inventor: Bahman Sepahpur, 1201 Lincoln Mall, Suite 800, Lincoln, Nebr. 68508

[21] Appl. No.: 635,603

[22] Filed: Jul. 30, 1984

[51] Int. Cl.⁴ .............................................. A47G 23/04
[52] U.S. Cl. ................................... 126/246; 126/400; 220/429
[58] Field of Search ...................... 126/400, 246, 375; 206/557, 515; 220/429, 427, 426; 219/439, 430; 165/10, DIG. 4

[56] References Cited

U.S. PATENT DOCUMENTS

| | | |
|---|---|---|
| 738,573 | 9/1903 | Rich ..................................... 126/246 |
| 930,634 | 8/1909 | Waddell . |
| 1,049,385 | 1/1913 | Mohrenwitz . |
| 1,948,778 | 2/1934 | Zoia ................................. 126/246 X |
| 2,582,735 | 1/1952 | Alaj ..................................... 126/246 |
| 2,810,276 | 10/1957 | Murray . |
| 3,038,058 | 6/1962 | Gordon, Jr. ..................... 126/246 X |
| 3,288,346 | 11/1966 | Peppler . |
| 3,557,774 | 1/1971 | Kreis . |
| 3,613,933 | 10/1971 | Pilz et al. . |
| 3,734,077 | 5/1973 | Murdough et al. . |
| 3,837,330 | 9/1974 | Lanigan et al. . |
| 3,916,872 | 11/1975 | Kreis et al. . |
| 3,937,389 | 2/1976 | Wind . |
| 4,086,907 | 5/1978 | Rothschild . |
| 4,153,047 | 5/1979 | Dumbeck ........................... 126/400 |
| 4,183,435 | 1/1980 | Thompson et al. . |
| 4,206,845 | 6/1980 | Christian . |
| 4,210,201 | 7/1980 | O'Hanlon ...................... 126/436 X |
| 4,217,476 | 8/1980 | Bellavoine . |
| 4,237,023 | 12/1980 | Johnson et al. . |
| 4,246,884 | 1/1981 | Vandas . |
| 4,327,136 | 4/1982 | Thompson et al. . |

Primary Examiner—Randall L. Green
Attorney, Agent, or Firm—Mitchell B. Wasson; Martin P. Hoffman; Charles W. Fallow

[57] ABSTRACT

A heat storage food container provided with a thermal storage medium, such as wet sand, which retains the heat of the environment to which it has been subjected. The storage medium is provided between a gas impermeable upper shell and a lower gas impermeable thermal insulative shell. The container is adapted to be placed within microwave ovens and heated to a predetermined temperature. Subsequently, food which is prepared in the same or a different environment from which the food container is subjected is placed on the container and will remain at a suitable serving temperature for a relatively long period of time.

4 Claims, 2 Drawing Figures

HEAT STORAGE FOOD CONTAINER

BACKGROUND OF THE INVENTION

Due to various sociological and technicological changes in present day society, the types of food which the public ingests as well as the manner in which these foods are prepared has been drastically altered in the last several years. So-called "fast-food" restaurants have proliferated in recent times to such an extent that the percentage of people who frequent these establishments on a regular basis has increased greatly. Among the reasons for this increase, is the technology which has recently been developed for quickly heating and preparing the foods. One of these advances has been the microwave oven which greatly shortens the time it takes to initially heat or reheat the food.

However, many disadvantages abound which render these types of establishments unpalatable. For example, while the microwave oven would adequately heat the food which is placed therein, the typical platter or food receptacle which is placed under the food while it is being heated in the microwave oven does not become warm or retain any heat. Additionally, if the food is placed within a so-called disposable container containing thermal insulative material, the food contained therein will cool relatively rapidly and not retain heat for an appreciable amount of time. This situation also is true when food is prepared at a central kitchen to be dispensed to individuals not in proximity with the central kitchen, such as food in hospitals, nursing homes and the like.

Much time and effort has been undertaken to develop a heat-retaining food container which would ensure that food placed therein would retain its heat for a relatively long period of time. U.S. Pat. No. 3,557,774 issued to Kreis, U.S. Pat. No. 3,734,077 issued to Murdough et al, U.S. Pat. No. 3,837,330 issued to lanigan et al and U.S. Pat. No. 3,916,872 issued to Kreis et al and U.S. Pat. No. 4,246,884 issued to Vandas are all directed to heat-storage dishes which are heated with or without food provided therein to maintain the food at a proper temperature for a substantial period of time.

U.S. Pat. No. 3,837,330 describes a heat-retaining server which is preheated to a particular temperature prior to the placement of food thereon. The server contains a heat-retention member formed of aluminum, an aluminum alloy, or some other rigid material having superior heat absorbing and retaining properties. An upper metal shell and a lower metal shell surround the heat retention member.

U.S. Pat. No. 3,557,775 shows a heat storage dish provided with a heat insulating filler such as rockwool provided between two walls composed of non-corrosive chromium nickel sheet steel. Additionally, a heat-storage plate consisting of aluminum is also employed.

U.S. Pat. No. 3,734,077 discusses a heat-retaining food server employing a heat-retaining pellet formed of the same material discussed with respect to U.S. Pat. No. 3,837,330. A resilient pad, formed of non-woven glass fibers or any other suitable insulating and cushioning material, occupies the space between the undersurface of the pellet and a lower shell. An upper shell is included and, along with the lower shell, are formed from stainless steel or any other material having similar properties of durability and strength.

U.S. Pat. No. 3,916,872 depicts a heat-storage plate provided with an insulation member formed of a plastic-type material having sufficiently low thermal conductivity and a heat storage plate composed of a substantially circular metallic body member.

U.S. Pat. No. 4,246,884 shows a plate warmer containing a heat storage material comprising beads of synthetic petroleum wax which are compressed to form a solid core. This core is surrounded by a top shell member fabricated from a sheet of stainless steel.

All of the heat-retaining food servers listed hereinabove utilize a heat storage or insulation means provided adjacent to or surrounded by a metallic plate or shell. Consequently, none of the food containers disclosed in these patents could be utilized in a microwave oven.

U.S. Pat. Nos. 4,183,435 and 4,327,136 issued to Thompson et al as well as U.S. Pat. No. 4,217,476 issued to Bellavoine illustrate containers for food products to be cooked or reheated in microwave ovens. While the patent to Bellavoine does indicate that polystyrene foam is provided within a meal tray to insure thermal insulation between various compartments in the tray, none of these references utilize a heat-retentive medium therein.

SUMMARY OF THE INVENTION

The present invention overcomes the disadvantages of the prior art by providing a thermal storage food container entirely utilizing non-metallic substances. The base of the container contains a heat-retentive thermal storage medium such as wet sand provided in a cavity formed between a thermally conductive, puncture-resistant food upper shell and a lower thermal insulative shell. The upper shell is constructed from a non-metallic gas impermeable material such that when the container is subjected to microwave energy when placed within a microwave oven, the moisture contained in the wet sand would evaporate thereby producing steam which will remain within the thermal storage medium and retain heat for a considerable amount of time. Food which is prepared either in a microwave environment or in a conventional oven or stove, when placed on the food container, would remain warm for a considerable amount of time.

Additionally, the present invention also contemplates the use of providing an encapsulated heat retentive thermal storage medium in a plate warmer wherein a food container is placed upon the plate warmer which has been previously subjected to microwave energy in a microwave oven.

BRIEF DESCRIPTION OF THE DRAWINGS

The foregoing and other and further features and advantages of the present invention will be more readily apparent from the following detailed description of the invention when taken in conjunction with the accompanying drawings in which.

DETAILED DESCRIPTION OF THE PRESENT INVENTION

Figure 1:
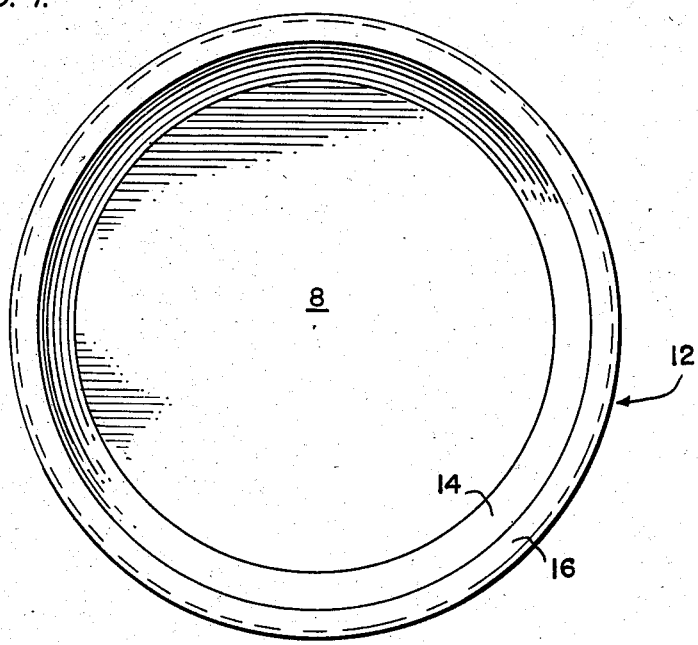
FIG. 1 is a plan view of the present invention without a top lid.
Figure 2:
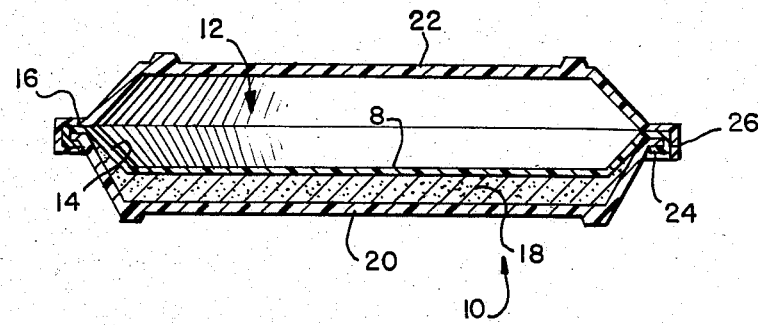
FIG. 2 is a cross-sectional view of the present invention including the top lid.

As shown in FIGS. 1 and 2, the heat storage food container 10 of the present invention contains a generally circular upper shell 12 for the placement of food thereon, which when combined with a lower thermal insulative shell 20 forms a circular or dish-shaped food container having a cavity therebetween. Although the present invention illustrates and describes a food container having a generally circular shape, it should be noted that the particular container shape and size can vary dependent upon the particular food which will be utilized or storage requirements relating to the container itself. A heat-retentive thermal storage medium 18 such as wet sand is provided in the cavity between the upper shell 12 and the lower thermal insulative shell 20. The upper shell 12 can be considered to be fabricated from a unitary sheet of non-metallic, plastic material having a central area 8 and a flared circumferential side wall portion 14 extending generally upwardly and outwardly from the surface 8. The upper shell 12 should be formed from a material which is gas impermeable, thermally conductive as well as puncture-resistant such that there is an adequate heat transfer between the food provided on the surface and the thermal storage medium 18, and allows an individual to utilize utensils to cut and eat the food provided upon the surface.

The heat-retentive thermal storage medium can consist of any non-metallic material which, when subjected to a particular environment, would retain the heat of that particular environment. Therefore, when subjected to heat or microwave energy, the thermal storage medium would retain this heat for a relatively long amount of time and if subjected to a cold environment, would retain this cold condition for an equally long amount of time. Although many different mediums can be utilized, it has been determined that a particularly efficacious medium would be wet sand which prior to being subjected to microwave energy has moisture therein. When subjected to microwave energy in a microwave oven, the moisture within the wet sand evaporates and steam is formed which would be retained between the upper shell 12 and the thermal insulative shell 20. Since both the upper shell 12 and the lower shell are constructed of gas impermeable materials, the steam will be retained therebetween for a relatively long period of time, thereby insuring that food placed thereupon would remain heated for an equally long time. The peripheral edge 16 of the wall 14 is provided with a flange 24 molded around the top edge of the lower thermal insulative shell 20 to completely seal the cavity formed between the upper shell 12 and the thermal insulative shell 20. This flange insures that the thermal storage medium 18 will be permanently retained between the upper shell 12 and the thermal insulative shell 20. Additionally, this flange 24 is molded in such a manner to permit the stacking of the container. The thermal insulative shell 20 can be formed of a suitable non-metallic material such as plastic having a low thermal conductivity.

A top lid 22 can be provided to insure that food provided to the upper shell 12 would remain warm. This lid would be constructed of a thermally insulative material having a low thermal conductivity similar to the material utilized with respect to the thermal insulative shell 20. A flange 26 is provided along the outer periphery of the lid 22 which would fit over and frictionally engage the flange 24 of the upper shell 12. Additionally, this particular design would allow the lids to be stacked while being stored. Alternately, the lids could be permanently hinged with respect to the upper shell 12 and the lower thermal insulative shell 20.

In use, the food container 10 can be subjected to microwave energy generated by a microwave oven. The microwave energy would produce steam in the wet sand and the heat generated thereby would be retained for a relatively long period of time. Food which is heated utilizing various heat sources such as a stove, conventional oven, or microwave oven is then placed upon the upper shell. The lid 22 is then placed upon the container 10 which can now be transported to its ultimate destination.

Additionally, the present invention can be used as a plate warmer upon which food provided on a container or plate is placed. The plate warmer is subjected to microwave energy within a microwave oven and the moisture provided within the wet sand evaporates and is retained as steam in a cavity provided between upper and lower shells.

Although this particular invention is primarily directed to non-disposable food containers, it can be appreciated that a disposable use could be contemplated. For example, the lower thermal insulative shell 20 as well as the removable lid 22 could be constructed of a thermally insulative material such as styrofoam. Similarly, a number of additional variations and modifications may be apparent to those skilled in the art. Therefore, the invention is not limited thereto and the scope and breadth of the invention is to be determined from the following claims.

What I claim is:

1. A heat retentive food server utilized in a microwave environment adapted to have food placed thereupon comprising:
    an upper non-metallic shell member;
    a lower styrofoam shell member; said upper and lower shell members forming a sealed cavity therebetween; and
    a heat retention means consisting of wet sand provided within and completely filling said cavity, whereby when said food container is placed in a microwave environment, said wet sand retains heat for a relatively long amount of time.

2. The heat retentive food server in accordance with claim 1 wherein the outer periphery of said upper non-metallic shell member is provided with a flange surrounding the outer periphery of said lower styrofoam shell member.

3. The heat retentive food server in accordance with claim 2 further including a removable lid adapted to frictionally engage said flange of said upper non-metallic shell.

4. A method for providing a heat retentive food server for retaining heat for maintaining food at an elevated serving temperature for a period of time comprising:
    encapsulating a heat retentive thermal storage medium consisting of wet sand between a non-metallic shell member and a styrofoam shell member, said two shell members forming a sealed cavity and said wet sand completely filling said cavity and
    subjecting said food server to microwave energy, whereby the moisture contained in said thermal storage medium evaporates to form steam.

* * * * *